United States Patent
Ming

(10) Patent No.: US 7,999,856 B2
(45) Date of Patent: Aug. 16, 2011

(54) DIGITAL IMAGE STABILIZATION METHOD FOR CORRECTING HORIZONTAL INCLINATION DISTORTION AND VERTICAL SCALING DISTORTION

(75) Inventor: Zhao Ming, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 678 days.

(21) Appl. No.: 12/073,838

(22) Filed: Mar. 11, 2008

(65) Prior Publication Data

US 2008/0225127 A1     Sep. 18, 2008

(30) Foreign Application Priority Data

Mar. 12, 2007   (KR) .................. 10-2007-0024197

(51) Int. Cl.
*H04N 5/228*     (2006.01)
*G06K 9/32*     (2006.01)

(52) U.S. Cl. ................................. 348/208.6; 382/294

(58) Field of Classification Search ............. 348/208.99, 348/208.1, 208.4, 208.6; 382/293–295
See application file for complete search history.

(56) References Cited

U.S. PATENT DOCUMENTS

| 6,694,064 | B1 * | 2/2004 | Benkelman | 382/284 |
| 2004/0100563 | A1 * | 5/2004 | Sablak et al. | 348/211.4 |
| 2008/0273751 | A1 * | 11/2008 | Yuan et al. | 382/103 |

FOREIGN PATENT DOCUMENTS

| JP | 2003-115052 | 4/2003 |
| JP | 2006-058945 | 3/2006 |
| KR | 1020040004297 | 1/2004 |

* cited by examiner

*Primary Examiner* — Timothy J Henn
(74) *Attorney, Agent, or Firm* — Harness, Dickey & Pierce, P.L.C.

(57) ABSTRACT

Provided is a digital image stabilization method. The method includes: extracting characterizing points from a current frame; matching the characterizing points of the current frame with characterizing points of a previous frame; detecting an outlier from the matched characterizing points and removing the outlier; calculating homography using the characterizing points from which the outlier has been removed; and correcting the current frame using the homography.

18 Claims, 4 Drawing Sheets

DIGITAL IMAGE STABILIZATION METHOD FOR CORRECTING HORIZONTAL INCLINATION DISTORTION AND VERTICAL SCALING DISTORTION

PRIORITY STATEMENT

This application claims priority under 35 U.S.C. §119 to Korean Patent Application No. 10-2005-0024197, filed on Mar. 12, 2007, in the Korean Intellectual Property Office, the entire contents of which are incorporated herein by reference.

BACKGROUND

1. Field

Example embodiments relate to a digital image stabilization method, and more particularly, to a digital image stabilization method capable of correcting an image by using homography to indicate correlations between two image frames used for a conventional panorama image if the image is distorted or moves in a horizontal/vertical direction due to camera shake.

2. Description of the Related Art

The quality and resolution of image sensors based on a CMOS process has recently increased, allowing the production of inexpensive digital cameras. Digital cameras are becoming increasingly miniaturized due to the intrinsic characteristics of CMOS image sensors, and are thus being applied to portable information terminals such as PDAs, cellular phones, smart phones, etc. An extension of a wired/wireless communication network makes it possible to capture, process, and transmit desired images at any time and place.

An increase in the use of mobile communication terminals involves image scattering due to a camera shake. Therefore, it may be necessary to correct motion such as camera shake in order to stabilize images. A gyro sensor or an image processor may be used to correct the motion of images.

The image processor may be used to compare a current frame and a previous frame and correct the motion of an image according to the comparison result. An image memory of a digital camera for storing the previous frame may be used to calculate the change between the current frame and the previous frame using a motion vector. The image processor may be widely used for small digital cameras or mobile communication terminals since it may not require mechanical or physical elements and may be easier to employ owing to its simple structure.

FIG. 1 is a flowchart illustrating a conventional image motion correction method that may use an image processor. An image projection method may be used to calculate a motion vector of an image and correct the image using the motion vector.

Referring to FIG. 1, if a camera system in the conventional art operates and a motion correction function starts, the resolution for the correction of motion is determined (Operation 110). A motion displacement is considered to determine the resolution lower than a whole resolution. A plurality of window regions for calculating the motion vector are established (Operation 120). Row/column lines to be sampled are established in each window region (Operation 130).

Thereafter, data is extracted from the row/column lines (Operation 140), and compared with corresponding data extracted from a previous image frame (Operation 150). The motion vector is calculated based on the comparison result (Operation 160). A start point moves by the motion vector (Operation 170). A current image frame having the corrected motion is output (Operation 180).

As described above, the conventional image motion correction method calculates the motion vector using the sampled row/column line data in a definite window region of the current image frame. If the image shakes, the image may move only in a horizontal or vertical direction. The motion vector is calculated on the assumption that the horizontal or vertical motion has the same magnitude over the whole image.

FIG. 2 illustrates image variations in the conventional art, due to camera shake. Referring to FIG. 2, a center image shows no camera movement. An upper image shows upward camera movement. A lower image shows downward camera movement. A left image leftward camera movement. A right image shows rightward camera movement.

When the camera moves upward, the image may be elongated. When the camera moves downward, the image may be compressed. When the camera moves left, the image leans to the left. When the camera moves right, the image leans to the right.

In particular, a conventional CMOS image sensor used with a rolling shutter does not simultaneously output optical signals from a plurality of optical elements for receiving data of a single frame to a floating diffusion (FD) node, but outputs them in row units, which greatly increases the image distortion when the camera shakes.

SUMMARY

Example embodiments provide a digital image stabilization method capable of effectively correcting an image if the image moves in a horizontal/vertical direction, and may be distorted by horizontal leaning or vertical scaling due to digital camera shake.

According to an example embodiment, there may be provided a digital image stabilization method for correcting camera shake of an image capture apparatus, the method comprising: extracting characterizing points from a current frame; matching the characterizing points of the current frame with characterizing points of a previous frame; detecting an outlier from the matched characterizing points and removing the outlier; calculating homography using the characterizing points from which the outlier has been removed; and correcting the current frame using the homography.

The correcting of the current frame may comprise: accumulating the homography and previously calculated homography; determining whether each value of parameters constituting the accumulated homography may be within a specific range; and if each value is within the specific range, correcting the current frame by inversely transforming the current frame using the accumulated homography.

The homography may be a matrix in the form of the following, $$\begin{bmatrix} 1 & h_2 & h_3 \\ 0 & h_5 & h_6 \\ 0 & 0 & 1 \end{bmatrix}$$

wherein $h_2$ denotes an amount of shear change, $h_5$ denotes an amount of scaling change, and $h_3$ and $h_6$ denote amounts of location change.

The extracting of the characterizing points may comprise: searching for a salient region of an image using a saliency map; and extracting the characterizing points using luminescence of a pixel included in the salient region.

A Kanade-Lucas-Tomasi corner detector (KLT-CD) algorithm may be used to extract the characterizing points.

The method may further comprise: comparing an average luminescence of the current frame with that of the previous frame; and if the average luminescences differ from each other, correcting the difference in the average luminescences.

A normalized cross correlation (NCC) algorithm may be used to matching the characterizing points. A random sample consensus (RANSAC) algorithm may be used to detect the outlier. A Levenberg-Marquardt (LM) non-linear minimization algorithm may be used to calculate the homography.

The method may be applied to a CMOS image sensor.

According to an example embodiment, there may be provided a digital image stabilization method for correcting camera shake of an image capture apparatus, the method comprising: extracting characterizing points from a current frame; matching the characterizing points of the current frame with characterizing points of a previous frame; detecting an outlier from the matched characterizing points; determining whether the outlier may be greater than a threshold value; if the outlier may be greater than the threshold value, calculating a motion vector indicating the distance and direction of movement of an image using an image projection method; if the outlier may be less than the threshold value, removing the outlier and calculating homography using the characterizing points from which the outlier has been removed; and correcting the current frame using the motion vector or the homography.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

The above and other features and advantages of example embodiments may become more apparent by describing in detail exemplary embodiments thereof with reference to the attached drawings in which.

DESCRIPTION OF EXAMPLE EMBODIMENTS

Figure 1:
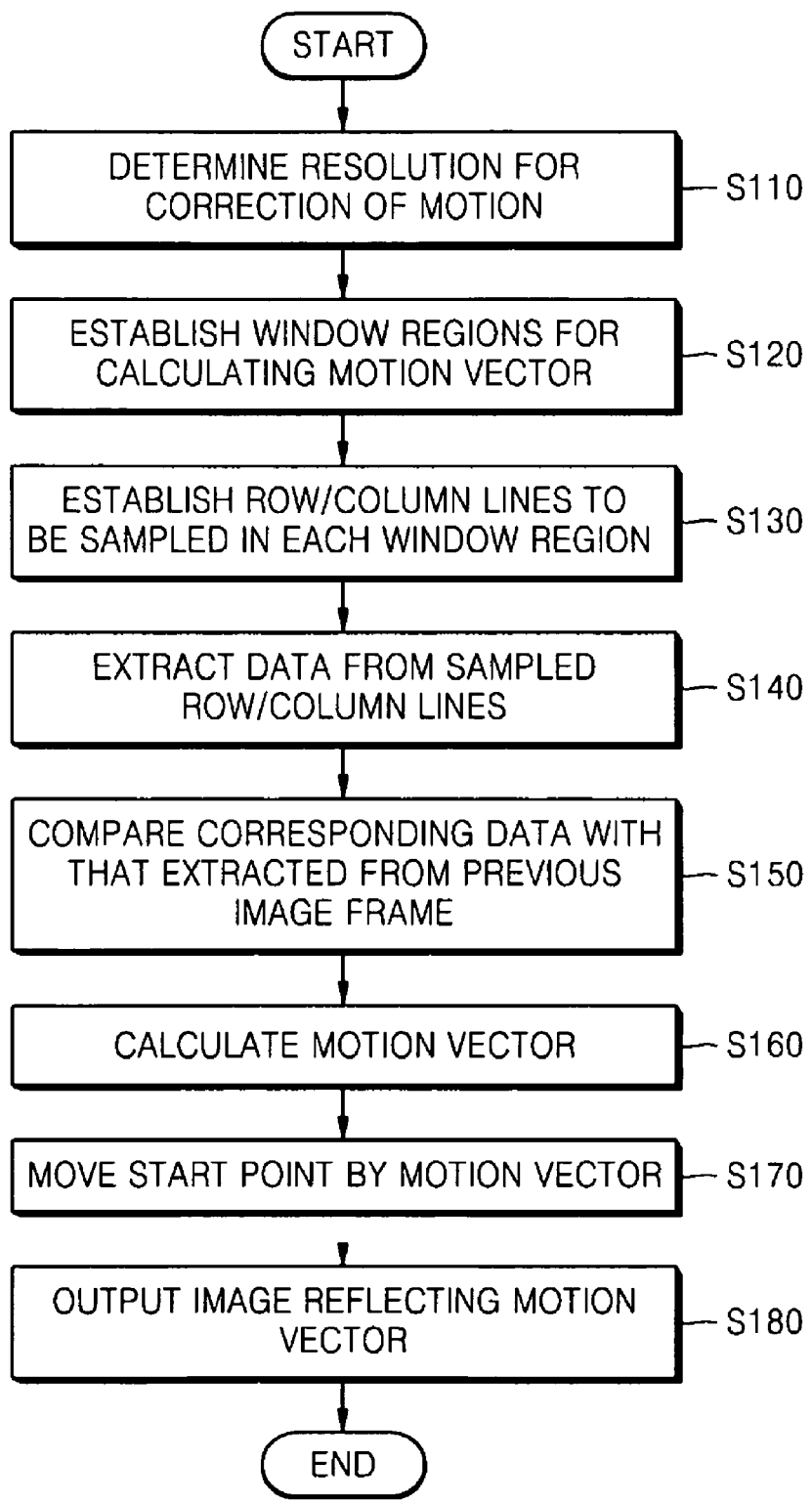
FIG. 1 is a flowchart illustrating a conventional image motion correction method using an image processor.
Figure 2:
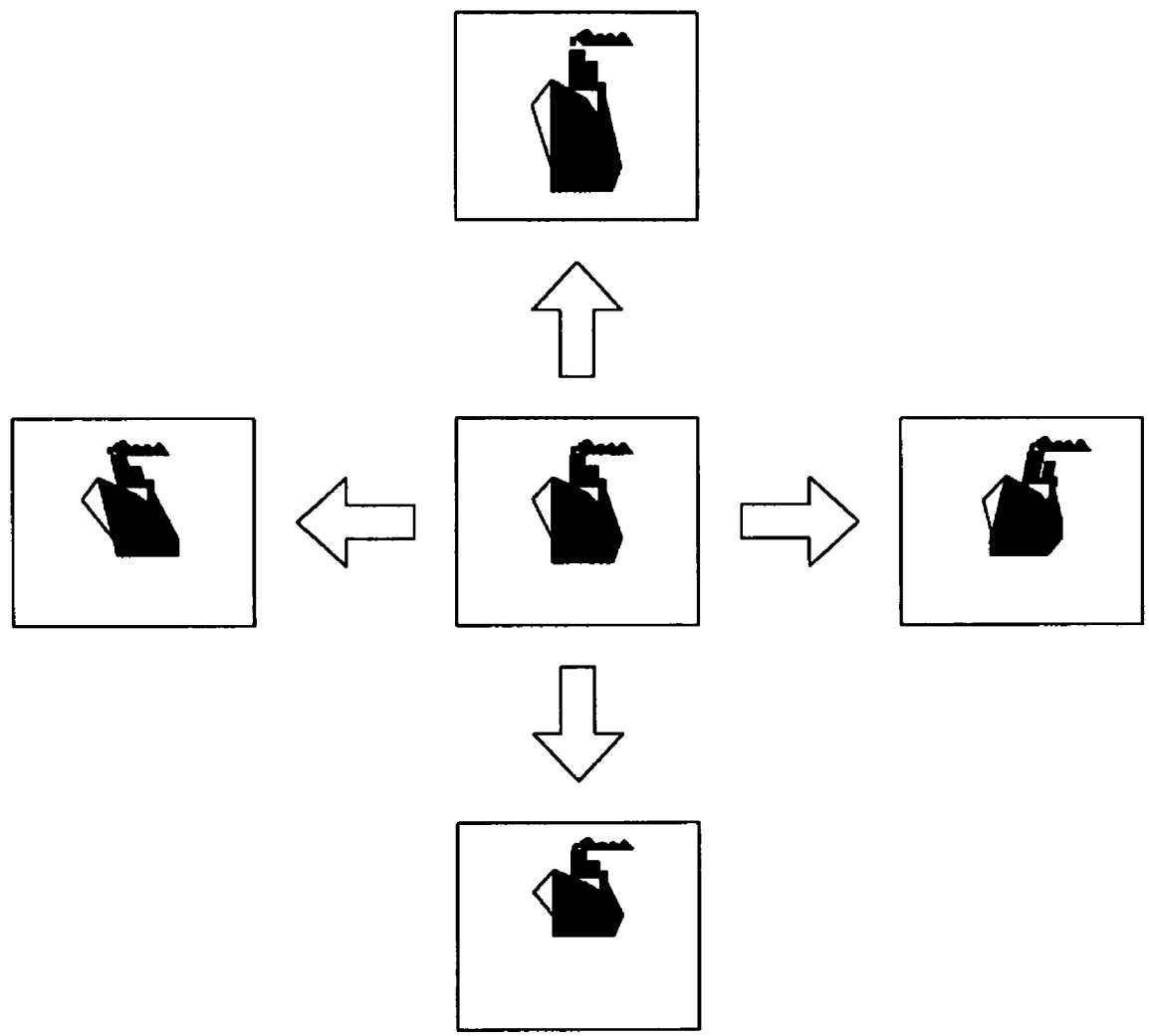
FIG. 2 illustrates image variations due to camera shake.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments will now be described more fully with reference to the accompanying drawings. Example embodiments may, however, be embodied in many different forms, and may not be construed as being limited to the embodiments set forth therein; rather, these embodiments are provided so that this disclosure will be thorough and complete, and will fully convey the concept of the example embodiments to those skilled in the art.

Figure 3:
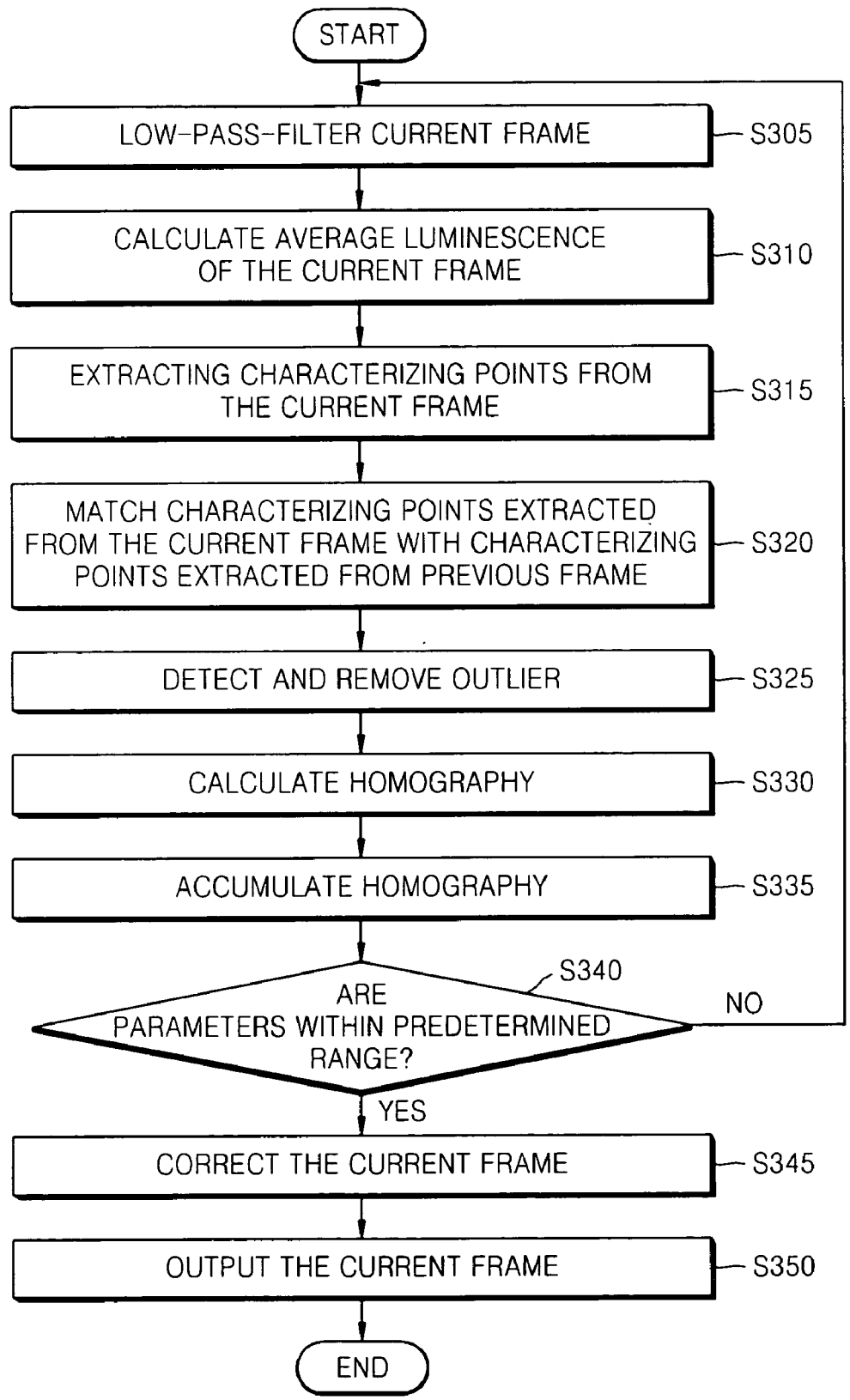
FIG. 3 is a flowchart illustrating a digital image stabilization method according to an example embodiment.

FIG. 3 is a flowchart illustrating a digital image stabilization method according to an example embodiment. Referring to FIG. 3, to remove a noise component of a current frame, the frame may be low-pass-filtered (Operation 305). A high frequency component including noise may be removed by the low-pass-filtering, thereby increasing a signal to noise ratio (SNR). The average luminescence of the current frame may be calculated (Operation 310). Characterizing points may be extracted from the current frame (Operation 315).

Operation 315 will now be described in detail.

The current frame may be divided into a plurality of windows. For example, the horizontal dimension of the current frame may be divided into 5, and the vertical dimension thereof may be divided into 7, so that the current frame may be divided into a total of 35 windows. Though the characterizing points may be extracted from each window of the current frame, a saliency map may be used to extract the characterizing points in order to conduct a more effective search.

The saliency map is based on the theory that there may be a high possibility that the characterizing points may be included in a salient region of an image.

The standard deviation of the average luminescence of the current frame and the luminescence of each window of the current frame may be calculated. The standard deviation may be calculated according to equation 1, $$\sigma = \sqrt{\frac{\sum (x_i - \mu)^2}{N}} \quad (1)$$

wherein $\sigma$ may denote the standard deviation of each window, N may denote the total number of windows, $\mu$ may denote the average luminescence of the current frame, and $x_i$ may denote the luminescence of each pixel of each window.

If the standard deviation of a window may be greater than a reference value, there is a high possibility that the window may include the characterizing point. If the standard deviation of a window may be smaller than a reference value, there is a low possibility that the window may include the characterizing point.

After finding salient regions from the current frame, the characterizing points may be extracted from each salient region. A Harris corner detector (H-CD) algorithm or a Kanade-Lucas-Tomasi corner detector (KLT-CD) algorithm may be used to extract the characterizing points.

The process of extracting the characterizing points using the KLT-CD algorithm will now be described.

A luminescence value of each pixel included in the salient regions may be differentiated in x and y directions. A transpose matrix may be multiplied by the luminescence value. An eigenvalue $\lambda$ calculated from a final matrix may be analyzed. A pixel having the largest eigenvalue $\lambda$ may be selected from the pixels included in each salient region as the characterizing points, which may be expressed according to equation 2, $$g = \begin{bmatrix} g_x \\ g_y \end{bmatrix}$$

$$gg^T = \begin{bmatrix} g_x \\ g_y \end{bmatrix} \begin{bmatrix} g_x & g_y \end{bmatrix} = \begin{bmatrix} g_x^2 & g_x g_y \\ g_x g_y & g_y^2 \end{bmatrix} \quad (2)$$

In the example embodiment, the saliency map may be used to search for the salient regions and calculate a corner point of each salient region in order to extract the characterizing points. However, a skilled person in the relevant technical field may extract the characterizing points using another method. For example, a variation rate in light and shade of each pixel may be calculated, and a plurality of pixels having a large value may be selected as the characterizing points.

The characterizing points extracted from the current frame may be matched with characterizing points extracted from a previous frame (Operation 320). The previous frame and the locations and regions of the characterizing points extracted from the previous frame may be stored in a memory included in a CMOS image sensor. Therefore, the matching operation may include receiving data on the previous frame from the memory and extracting the characterizing points of the previous frame that correspond to those of the current frame.

Before matching the characterizing points, the average luminescence of the current frame and the previous frame may be compared with each other. If the average luminescence differs from each other, the current frame and the previous frame may be corrected to have the same average luminescence, which may be necessary for finding corresponding matching points.

The matching operation may be conducted using a correlation search using a normalized cross correlation (NCC) algorithm. Further, the matching operation may perform a similarity evaluation function indicating similarity between blocks, or a Graham search for correcting mismatched candidates through a convex hull test, to allow more exact and efficient matching.

The matching points may be found, on the assumption that a sub image region may be included in the current frame, using an entire region motion vector obtained by calculating a local motion vector of the sub image region, after estimating a local motion and calculating the entire region motion vector, after estimating the entire region motion using the location motion vector.

Although the characterizing points of the previous frame corresponding to the matching points of the current frame may be found, some characterizing points may be mismatched. The mismatching relationship may be referred to as an outlier. The outlier may reduce the accuracy of homography, that will be described later. Therefore, the outlier may need to be detected and removed (Operation 325).

A random sample consensus (RANSAC) algorithm may be used to detect the outlier. To perform the RANSAC algorithm, first, four matching points may be selected, and then the homography may be calculated using singular value decomposition (SVD); second, the homography may be used to calculate the distance between the four matching points; and third, if the distance is greater than a threshold value, the distance may be determined as the outlier, and if the distance is smaller than the threshold value, the distance may be determined as an inlier.

The homography may be calculated using the matched characterizing points from which the outlier has been removed (Operation 330). The homography used in a conventional panorama image arena is a 3×3 linear transformation matrix indicating variation relationships between two images. The homography includes parameters indicating translation, rotation, scaling, and shear of the two images. Levenberg-Marquardt (LM) non-linear minimization algorithm may be used to minimize errors in calculating the homography.

The homography is called a planar linear transformation since it indicates the linear transformation relationships between one image plane R1 and another image plane R2. All points of the image plane R2 match all points of the image plane R2 so that the homography may be used to transform all points of the image plane R2 into all points of the image plane R2. The homography used in an example embodiment may be expressed below, $$\begin{bmatrix} x_1 \\ y_1 \\ 1 \end{bmatrix} = \begin{bmatrix} 1 & h_2 & h_3 \\ 0 & h_5 & h_6 \\ 0 & 0 & 1 \end{bmatrix} \times \begin{bmatrix} x_0 \\ y_0 \\ 1 \end{bmatrix} \quad (3)$$

wherein $A(x_0, y_0)$ may denote the characterizing point of the previous frame, $B(x_1, y_1)$ may denote the characterizing point of the current frame, $h_2$ may denote a shear component, $h_5$ may denote a scaling component, and $h_3$ and $h_6$ may denote distance components. In an example embodiment, the homography may have a different form from the conventional homography to reduce the amount of calculation. The homography may be calculated according to equation 3 below, $$x_1 = x_0 + h_2 y_0 + h_3, y_1 = h_5 y_0 + h_6 \quad (4)$$

Parameters h2, h3, h5, and h6 of the homography may be calculated using the SVD. Two pairs of the matched characterizing points may be used to calculate the parameters of the homography, thereby halving the amount of operation necessary for calculating the homography, compared to the conventional method.

As described above, since $h_2$ may denote the shear component and $h_5$ may denote a scaling component, an analysis of $h_2$ and $h_5$ may make it possible to determine the degrees of lean or extension/compression of the current frame compared to the previous frame. If $h_2$ and $h_5$ are greater than the threshold value, the current frame may be corrected in a subsequent correction operation.

The homography may be accumulated (Operation 335). Since a frame represents 1/60 of a second, and camera shake generally has a period of less than 1/60 of a second, it may be difficult to use a comparison of two frames to determine if a shake caused the motion. Therefore, the homography indicating the correlations between the current frame and the previous frame may be multiplied by previous homography results in order to generate an entire homography, supposing that a first frame is not distorted or does not move.

It may be determined whether the parameters included in the accumulated homography are within a predetermined range (Operation 340). If the parameters are within the predetermined range, it may be determined that motion such as camera shake has occurred. If the parameters are beyond the predetermined range, it may be determined that motion did not occur, or a user's intended motion occurred. For example, if $h_2$ is within a predetermined range, it may be determined that the image leans. If $h_5$ is within a predetermined range, it may be determined that the image is extended or compressed. That is, each parameter may be individually determined.

If the parameters are beyond the predetermined range, the current frame may be output as it is, and the next frame may be received to repeatedly perform Operations 305 through 340. If the parameters are within the predetermined range, it may be determined that an undesired motion has occurred. The accumulated homography may be used to correct the current frame (Operation 345), and the current frame may be output (Operation 350).

Since the accumulated homography may indicate the correlations between the first frame and the current frame, if the homography is used to inversely transform the current frame, the current frame may be transformed into the first frame. That is, the current frame may be transformed into a previous image before the motion occurs. It is supposed that the first frame may not be distorted, and may not move.

Figure 4:
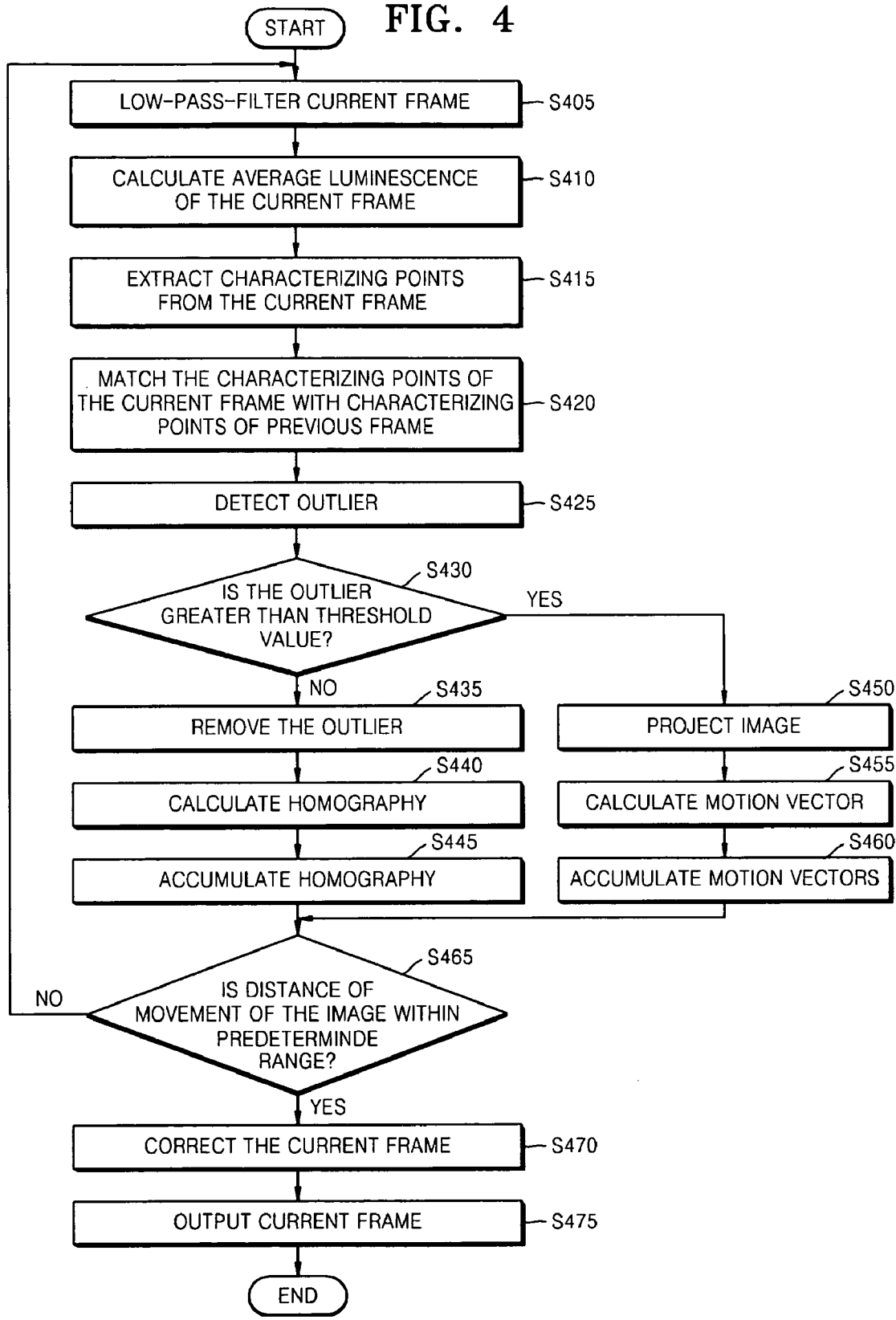
FIG. 4 is a flowchart illustrating a digital image stabilization method according to another example embodiment.

FIG. 4 is a flowchart illustrating a digital image stabilization method according to another example embodiment. Referring to FIG. 4, an input current frame may be low-pass-filtered (Operation 405). The average luminescence of the current frame may be calculated (Operation 410). Characterizing points may be extracted from the current frame (Operation 415). The characterizing points of the current frame may be matched to characterizing points of a previous frame (Operation 420). An outlier having an error may be detected (Operation 425). Operations 405 through 425 may be described with reference to FIG. 3 and thus their detailed descriptions are not repeated.

It may be determined whether the outlier is greater than a threshold value (Operation 430). The RANSAC algorithm may be used to detect the outlier. If the outlier is less than the threshold value, it may be removed (Operation 435). An inlier may be used to calculate homography (Operation 440). The homography and previous homography may be accumulated (Operation 445). It may be determined whether parameters included in the accumulated homography are within a specific range (Operation 465).

If the parameters are beyond the specific range, it may be determined that motion may not have occurred, or a user's intended motion may have occurred, and thus Operations 405 through 425 may be repeatedly performed. If the parameters are within the specific range, it may be determined that motion such as camera shake has occurred. Thus, the accumulated homography may be used to correct the current frame (Operation 470), and output the corrected current frame (Operation 475).

If the outlier is greater than the threshold value, the homography calculated using the inlier may have a problem in its reliability, such that it may be impossible to calculate the homography and correct the current frame. Therefore, the conventional image projection method may be used to calculate a motion vector (Operation 450). The image projection method and method of calculating the motion vector are described in detail with reference to FIG. 1.

The image projection method may be unable to detect distortion such as a horizontal inclination or an extension/reduction of vertical scaling, since the method is based on the assumption that an image may move along an x or y axis on an orthogonal coordinate system. The image projection method may be useful when it is impossible to calculate reliable homography.

The motion vector indicating the distance and direction of movement of the image may be calculated (Operation 455). The motion vector and previous motion vectors may be accumulated (Operation 460). Thereafter, it may be determined whether the distance of movement of the image calculated through the accumulated motion vector is within a specific range (Operation 465).

If the distance is within the specific range, it may be determined that motion such as camera shake occurs. Thus, the accumulated motion vector may be used to correct the current frame to a first frame (Operation 470), and output the corrected current frame (Operation 475). Operations 465 through 475 may be described above and thus their detailed descriptions are not repeated.

The digital stabilization method according to example embodiments may correct image movement change and image distortion as well as the effects of camera shake, thereby taking an optimized image.

While example embodiments have been particularly shown and described with reference to exemplary embodiments thereof, it will be understood by those of ordinary skill in the art that various changes in form and detail may be made therein without departing from the spirit and scope of the example embodiments as defined by the following claims.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A digital image stabilization method for correcting camera shake of an image capture apparatus, the method comprising:
    extracting characterizing points from a current frame;
    matching the characterizing points of the current frame with characterizing points of a previous frame;
    detecting an outlier from the matched characterizing points and removing the outlier;
    calculating homography using the characterizing points after the outlier has been removed; and
    correcting the current frame using the homography, wherein the correcting of the current frame includes,
        accumulating the homography and previously calculated homography,
        determining whether each value of parameters constituting the accumulated homography is within a specific range,
        if each value is within the specific range, correcting the current frame by inversely transforming the current frame using the accumulated homography.

2. The method of claim 1, wherein the extracting of the characterizing points comprises:
    searching for a salient region of an image using a saliency map; and
    extracting the characterizing points using luminescence of a pixel included in the salient region.

3. The method of claim 2, wherein a Kanade-Lucas-Tomasi corner detector (KLT-CD) algorithm is used to extract the characterizing points.

4. The method of claim 1, further comprising:
    comparing an average luminescence of the current frame with that of the previous frame; and
    if the average luminescence differs from each other, correcting the difference in the average luminescence, prior to the matching of characterizing points.

5. The method of claim 1, wherein a normalized cross correlation (NCC) algorithm is used to match the characterizing points.

6. The method of claim 1, wherein a random sample consensus (RANSAC) algorithm is used to detect the outlier.

7. The method of claim 1, wherein a levenberg-Marquardt (LM) non-linear minimization algorithm is used to calculate the homography.

8. The method of claim 1, wherein the method is applied to a CMOS image sensor.

9. A digital image stabilization method for correcting camera shake of an image capture apparatus, the method comprising:
    extracting characterizing points from a current frame;
    matching the characterizing points of the current frame with characterizing points of a previous frame;
    detecting an outlier from the matched characterizing points and removing the outlier;
    calculating homography using the characterizing points after the outlier has been removed; and
    correcting the current frame using the homography, wherein the homography is a matrix in the form of the following, $$\begin{bmatrix} 1 & h_2 & h_3 \\ 0 & h_5 & h_6 \\ 0 & 0 & 1 \end{bmatrix}$$

wherein $h_2$ denotes an amount of shear change, $h_5$ denotes an amount of scaling change, and $h_3$ and $h_6$ denote amounts of location change.

10. A digital image stabilization method for correcting camera shake of an image capture apparatus, the method comprising:
    extracting characterizing points from a current frame;
    matching the characterizing points of the current frame with characterizing points of a previous frame;
    detecting an outlier from the matched characterizing points;
    determining whether the outlier is greater than a threshold value;
    if the outlier is greater than the threshold value, calculating a motion vector indicating the distance and direction of movement of an image using an image projection method;
    if the outlier is less than the threshold value, removing the outlier and calculating homography using the characterizing points after the outlier has been removed; and
    correcting the current frame using the motion vector or the homography, wherein the correcting of the current frame includes,
        accumulating the homography and previously calculated homography,
        determining whether each value of parameters constituting the accumulated homography is within a specific range,
        if each value is within the specific range, correcting the current frame by inversely transforming the current frame using the accumulated homography.

11. The method of claim 10, wherein the extracting of the characterizing points comprises:
    searching for a salient region of an image using a saliency map; and
    extracting the characterizing points using luminescence of a pixel included in the salient region.

12. The method of claim 11, wherein a KLT-CD algorithm is used to extract the characterizing point.

13. The method of claim 10, further comprising:
    comparing an average luminescence of the current frame with that of the previous frame; and
    if the average luminescence differs from each other, correcting the difference in the average luminescence, prior to the matching of characterizing points.

14. The method of claim 10, wherein an NCC algorithm is used to match the characterizing points.

15. The method of claim 10, wherein a RANSAC algorithm is used to detect the outlier.

16. The method of claim 10, wherein an LM non-linear minimization algorithm is used to calculate the homography.

17. The method of claim 10, wherein the method is applied to a CMOS image sensor.

18. A digital image stabilization method for correcting camera shake of an image capture apparatus, the method comprising:
    extracting characterizing points from a current frame;
    matching the characterizing points of the current frame with characterizing points of a previous frame;
    detecting an outlier from the matched characterizing points;

determining whether the outlier is greater than a threshold value;

if the outlier is greater than the threshold value, calculating a motion vector indicating the distance and direction of movement of an image using an image projection method;

if the outlier is less than the threshold value, removing the outlier and calculating homography using the characterizing points after the outlier has been removed; and correcting the current frame using the motion vector or the homography, wherein the homography is a matrix in the form of the following, $$\begin{bmatrix} 1 & h_2 & h_3 \\ 0 & h_5 & h_6 \\ 0 & 0 & 1 \end{bmatrix}$$

wherein $h_2$ denotes an amount of shear change, $h_5$ denotes an amount of scaling change, and $h_3$ and $h_6$ denote amounts of location change.

* * * * *